United States Patent
Jun

(12) 
(10) Patent No.: US 6,243,780 B1
(45) Date of Patent: Jun. 5, 2001

(54) INTERFACE OF A MONITOR COMMUNICATING WITH PERSONAL COMPUTER

(75) Inventor: Il Jin Jun, Taegu (KR)

(73) Assignee: LG Electronics Inc. (KR)

( * ) Notice: Subject to any disclaimer, the term of this patent is extended or adjusted under 35 U.S.C. 154(b) by 0 days.

(21) Appl. No.: 08/979,118

(22) Filed: Nov. 26, 1997

(30) Foreign Application Priority Data

Nov. 29, 1996 (KR) .................................................. 96-59794

(51) Int. Cl.[7] ....................................................... G06F 13/00
(52) U.S. Cl. ......................... 710/129; 710/100; 710/104; 710/105; 710/126; 710/128; 710/131; 710/71
(58) Field of Search ............................. 710/71, 100, 104, 710/105, 126, 128, 129, 131

(56) References Cited

U.S. PATENT DOCUMENTS

| | | | |
|---|---|---|---|
| 5,781,250 | * | 7/1998 | Jun ........................................ 348/706 |
| 5,812,120 | * | 9/1998 | Shim .................................... 345/204 |
| 5,812,879 | * | 8/1998 | Moro .................................... 395/882 |

FOREIGN PATENT DOCUMENTS

| | | | |
|---|---|---|---|
| 0 456 923 A1 | 11/1991 | (EP) | ................................. G09G/1/16 |
| 0 612 053 A1 | 8/1994 | (EP) | ................................. G09G/1/164 |
| 0 708 399 A2 | 4/1996 | (EP) | ................................. G06F/3/14 |
| 2 291 770 | 1/1996 | (GB) | ................................. G09G/5/00 |
| 2 302 489 | 1/1997 | (GB) | ................................. G09G/1/16 |
| 2 314 493 | 12/1997 | (GB) | ................................. G09G/1/16 |
| WO 93/06587 | 4/1993 | (WO) | ................................. G09G/5/00 |
| WO 95/19620 | 7/1995 | (WO) | ................................. G09G/5/00 |

OTHER PUBLICATIONS

Microsof Press Computer Dictionary, Second Edition, pp. 49, 81, 334, 1994.*

* cited by examiner

Primary Examiner—Rupal D. Dharia
(74) Attorney, Agent, or Firm—Oppenheimer Wolff & Donnelly LLP

(57) ABSTRACT

A monitor having a microcomputer for performing a serial peripheral interface (SPI) communication with a personal computer (PC) which can improve the communicability between the PC and the monitor. The monitor includes an interface using in common one communication type utilizing a serial clock and a serial data through a printer port of the PC and the other communication type utilizing RS232C through a COM port of the PC, and data is stored in or read out from the microcomputer through the interface. The interface performs an input/output of the serial data utilizing the printer port and the COM port.

9 Claims, 4 Drawing Sheets

INTERFACE OF A MONITOR COMMUNICATING WITH PERSONAL COMPUTER

BACKGROUND OF THE INVENTION

1. Field of the Invention

The present invention relates to an interface of a monitor communicating with a personal computer (PC), and more particularly to an interface of a monitor which can input/output serial data through a printer port and a COM port simultaneously by providing a communication interface utilizing the printer port of the PC communicating with a microcomputer of the monitor, thereby improving communicability between the PC and the microcomputer of the monitor.

2. Description of the Related Art

As shown in FIG. 1, the conventional interface of a monitor communicating with a PC comprises a microcomputer 1 of the monitor for processing data by serial peripheral interface (SPI) communication, a printer port 3A, installed on the rear part of the PC 3, for inputting/outputting print data signals, and an interface section 2, connected between the printer port 3A and the microcomputer 1, for inputting/outputting data therethrough.

The interface section 2 comprises an inverter G1, connected between pin No. 2 of the printer port 3A of the PC 3 and a serial clock line (SCL) terminal of the microcomputer 1, for transmitting a clock line control signal, an inverter G2, connected between the SCL terminal of the microcomputer 1 and pin No. 15 of the printer port 3A of the PC 3, for checking the status of a clock signal transmitted from the inverter G1 to the microcomputer 1, an inverter G3, connected between pin No. 3 of the printer port 3A of the PC 3 and a serial data line (SDL) terminal, for transmitting a data line control signal, and a inverter G4, connected between the SDL terminal of the microcomputer 1 and pin No. 10 of the printer port 3A of the PC 3, for checking the status of data signal transmitted from the inverter G3 to the microcomputer 1.

The reference numberals R1 to R4 in FIG. 1 denote pull-up resistors.

The operation of the conventional interface of a monitor communicating with a PC will be explained.

First, in case that the PC 3 writes data into the microcomputer 1 through the clock line and the data line, the pin Nos. 2 and 3 of the printer port 3A of the PC 3 are initialized with 'high' level signals. At an initial stage, as illustrated in FIG. 2A, the starting condition of the data transmission is given at the point where the clock line and the data line go from a 'high' state to a 'low' state. At this time, the microcomputer 1 acknowledges that the PC 3 starts data reading on writing operation by detecting the starting condition through the clock line and data line.

In case of writing the data in the microcomputer, the PC 3 outputs data through the inverter G3, synchronizing the data with the clock signal applied to the inverter G1 of the interface section 2. The microcomputer 1 of the monitor then receives and stores in a built-in memory the clock signal and the data inputted from the inverters G1, G3. Meanwhile, in case of reading the data from the microcomputer 1, the PC 3 reads necessary data through the inverters G2, G4 form the microcomputer 1.

At this time, the PC 3 feeds back the data and the clock signal outputted from the inverters G1, G3 through the inverters G2, G4 of the interface section 2 to check whether or not the current clock line and the data line operate in a normal state. Also, the PC 3 acknowledges the read data by recognizing the clock inputted/outputted through the inverter G3. Specifically, the PC 3 transmits or reads the data byte by byte by acknowledging the rising edge of the ninth clock of the clock signal. At this time, the microcomputer 1 of the monitor displays the inputted/outputted data on the monitor screen so that the user can see the data.

If the stop condition is inputted as shown in FIG. 2A during the above-described data input/output operation, the PC 3 terminates the data input/output operation.

However, according to the conventional interface of a monitor communicating with a PC, the PC cannot perform a data communication with the microcomputer through the printer port if the printer cable is connected to the printer port of the PC, thereby decreasing the usability of the system. Also, it is impossible to compatibly perform a serial communication or parallel communication using the input/output ports of the PC, thereby greatly deteriorating the operability of the system.

SUMMARY OF THE INVENTION

It is an object of the present invention to solve the problems involved in the prior art, and to provide an interface of a monitor communicable with a PC which can input/output serial data simultaneously utilizing a COM port in parallel with the printer port of the PC, thereby improving the communicability between the PC and the microcomputer of the monitor.

In one aspect of the present invention, there is provided a monitor having a microcomputer for performing a SPI communication with a PC, the monitor comprising an interface using in common one communication type utilizing a serial clock and a serial data through a printer port of the PC and the other communication type utilizing RS232C through a COM port of the PC, wherein data is stored in or read out from the microcomputer through the interface.

In another aspect of the present invention, there is provided an interface of a monitor communicating with a PC, the monitor having a microcomputer for controlling input/output of parallel and serial data through the microcomputer and a D-sub connector for connecting the parallel and serial data, and the PC having a COM port for inputting/outputting the serial data by the RS232C and a printer port for inputting/outputting print data, the interface comprising:

a parallel communication section, connected between the printer port and the COM port of the PC and the D-sub connector of the monitor with parallel communication lines, for inputting/outputting data;

a serial switch, connected between the COM port and the D-sub connector, for switch-controlling the communication lines to effect a serial communication; and a transistor, connected to one side of the D-sub connector, for providing an interrupt switching signal to the microcomputer when the serial communication is effected.

In still anther aspect of the present invention, there is provided a communication interface in a display device having a processor for performing a serial interface communication with a computer, the communication interface comprising:

a serial port connector coupled to the processor and connectable to a serial port of the computer;

a parallel port connector coupled to the processor and connectable to a parallel port of the computer; and a switch operable to switch communication to the processor between the serial port when communication through the serial port is desired and the parallel port when communication through the parallel port is desired.

BRIEF DESCRIPTION OF THE DRAWINGS

The above object, other features and advantages of the present invention will become more apparent by describing the preferred embodiment thereof with reference to the accompanying drawings, in which.

DETAILED DESCRIPTION OF THE PREFERRED EMBODIMENT

Figure 3:
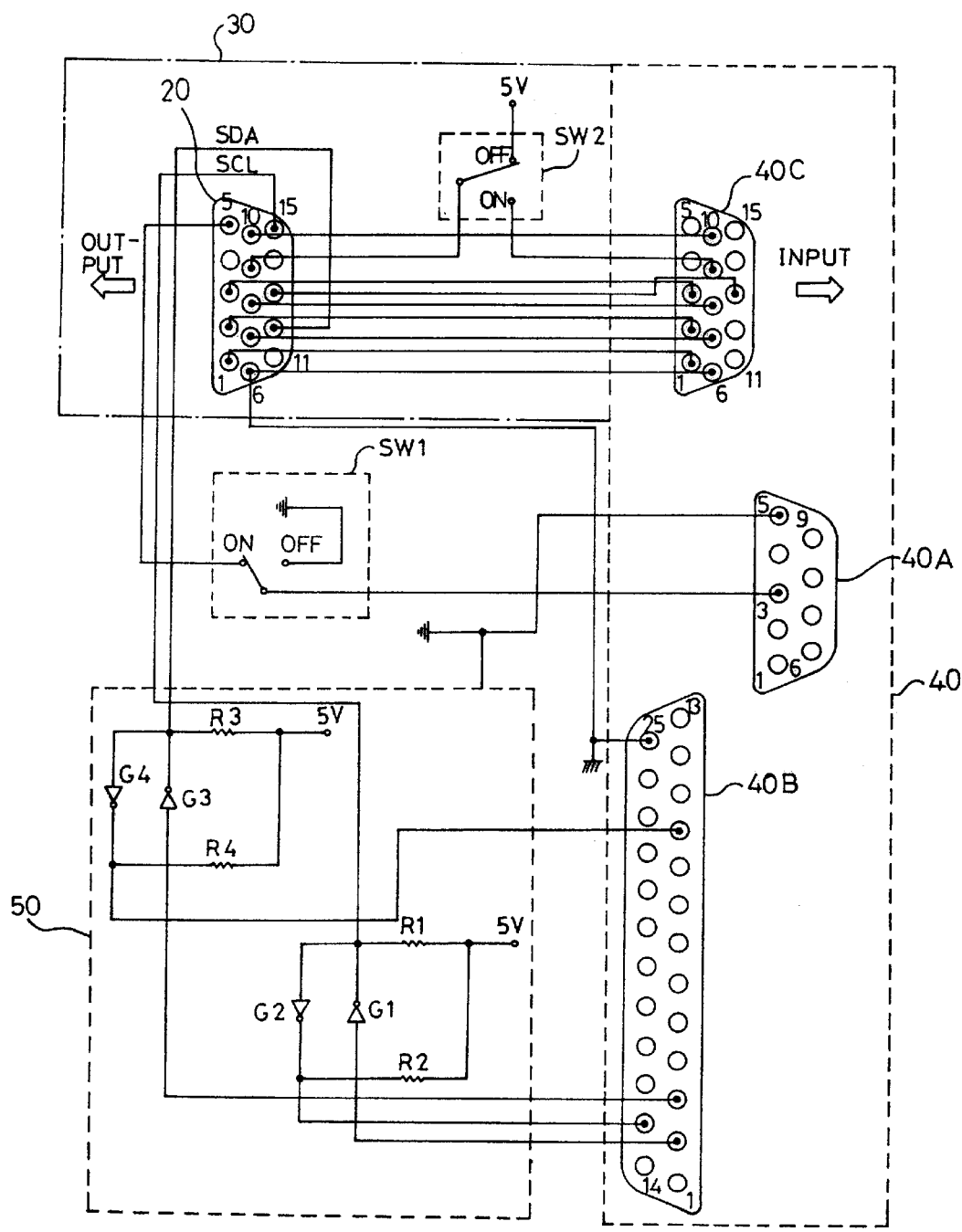
FIG. 3 is a block diagram of an interface of a monitor communicating with a PC according to the present invention.
Figure 4A:
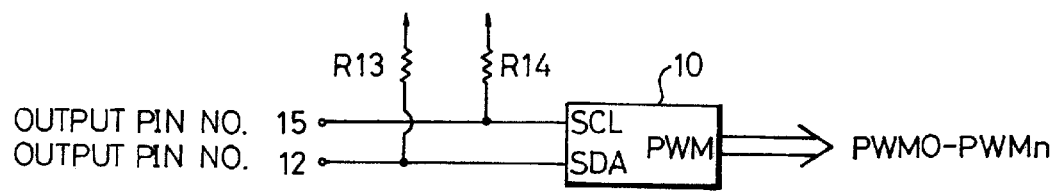
FIG. 4A is a schematic circuit diagram of the construction for controlling the display state under the control of a microcomputer of the monitor utilizing a serial clock and serial data through a printer port of the PC.
Figure 4B:
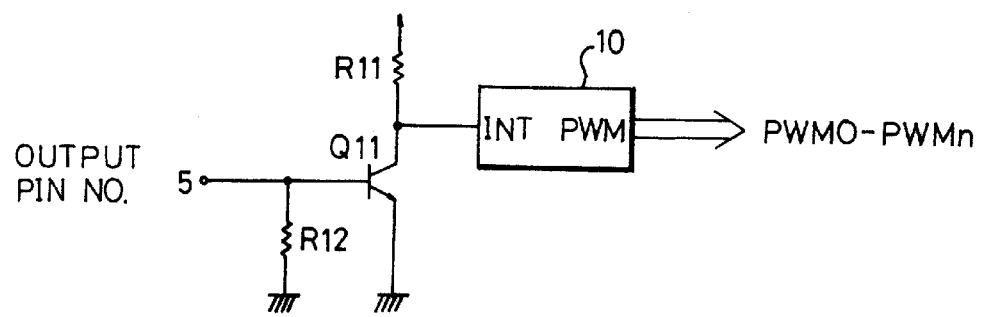
FIG. 4B is a schematic circuit diagram of the construction for controlling the display state under the control of a microcomputer utilizing a COM port of the PC according to the present invention.

FIGS. 3, 4A and 4B show an interface of a monitor for performing communication with a PC.

Referring to FIG. 3, the interface of the monitor for performing communication with a PC is connected between the monitor 30 having a D-sub connector (D-type miniature sub-connector) 20 for connecting parallel and serial data inputted to/outputted from a microcomputer of the monitor and the PC 40 having a COM port 40A for inputting/outputting the serial data and a printer port 40B for inputting/outputting printer data. The interface includes a parallel communication section 50, connected between the printer port 40B provided on the rear of the PC 40 and the COM port 40A for the RS232C communication, and the D-sub connector 20 provided on the rear of the monitor with parallel communication lines, for inputting/outputting data; a serial switch SW1, connected between the COM port 40A and the D-sub connector 20, for switch-controlling the communication lines to effect a serial communication; and a transistor Q11, connected to one side of the D-sub connector 20, i.e., pin No. 5, as shown in FIG. 4B, for providing an interrupt switching signal to the microcomputer 10 when the serial communication is effected.

The parallel communication section 50 includes an inverter G1 connected between pin No. 2 of the printer port 40B of the PC 40 and pin No. 15, which is a terminal of serial clock line of the D-sub connector 20, for transmitting a signal to control the clock line; an inverter G2 for feeding back the status of the clock signal transmitted from the inverter G1 to the microcomputer; an inverter G3 connected between pin No. 3 of the printer port 40B of the PC 40 and pin No. 12, which is a terminal of serial data line (SDL), of the D-sub connector 20 for transmitting the signal to control data line; and an inverter G4 connected between the SDL terminal of the D-sub connector 20 and pin No. 10 of the printer port 40B of the PC 40 for feeding back the data signal transmitted form the inverter G3 to the microcomputer to check the data signal.

The serial switch SW1 is connected between pin No. 3 of the COM port 40A and pin No. 5 of the D-sub connector 20 to perform switching operation for serial communication. On the rear face of the PC 40, a PC input port 40C is connected to the respective terminal pins of the D-sub connector 20 for transmitting an image signal and a synchronous signal from the PC 40. An SCL terminal and an SDA terminal of the microcomputer are connected between the pin No. 15 and pin No. 12, as shown in FIG. 4A. Also, the D-sub connector 20 is connected to the PC input port 40C for inputting/outputting the image signal and the synchronous signal. A switch SW2 is provided between pin No. 9 of the D-sub connector 20 and pin No. 9 of the PC input port 40C for writing data on a display data channel (DDC).

The pin No. 5 of the COM port 40A is connected to ground. The reference numerals R1 to R14 denote resistors.

Operation of the interface of a monitor communicating with PC as constituted above according to the present invention will now be explained with reference to FIGS. 3, 4A and 4B.

Figure 1:
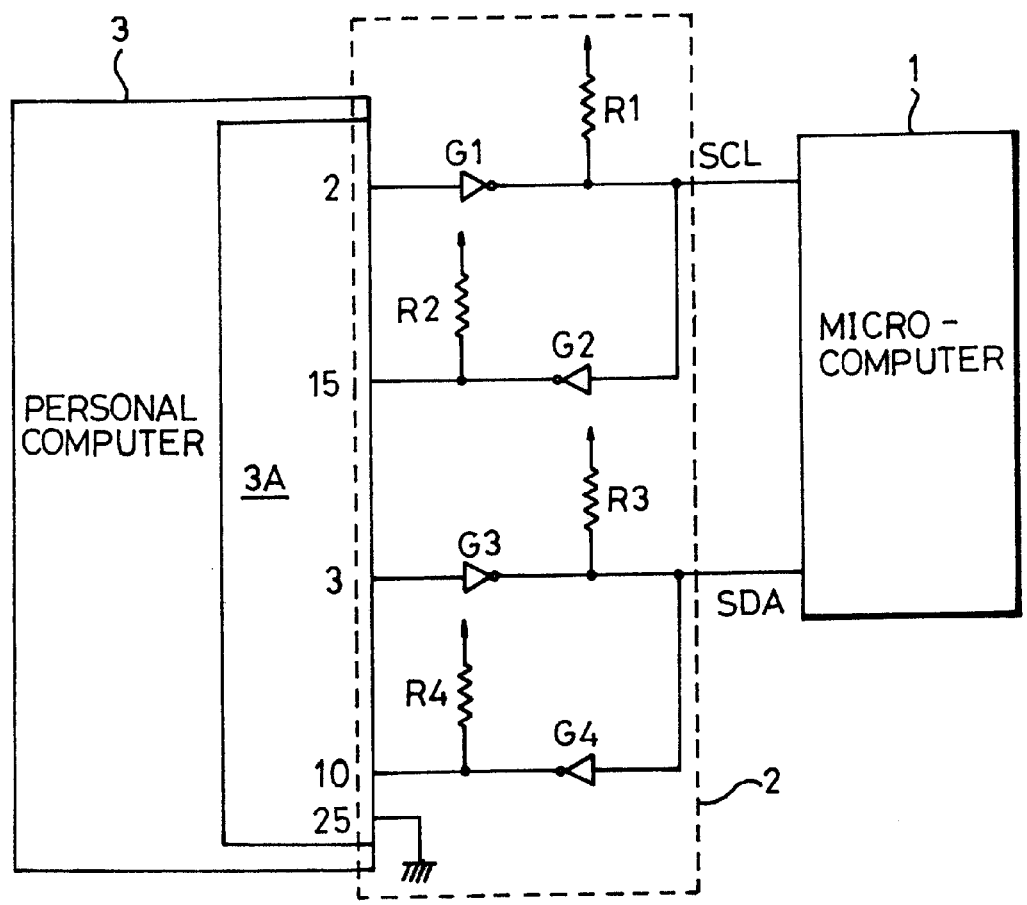
FIG. 1 is a block diagram illustrating the conventional interface of a monitor communicating with a PC.
Figure 2A:
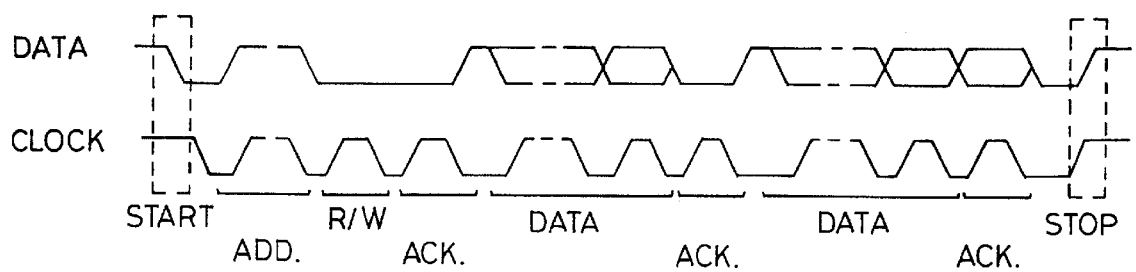
FIG. 2A is a waveform diagram illustrating the clock signal and data generated through the clock line and the data line for SPI communication.

FIG. 3 shows writing of serial data to the microcomputer by means of the parallel communication section 50. When transmitting a horizontal size control signal with serial data through the microcomputer of the monitor 30, the PC 40 determines the horizontal size value inputted by the user, and converts the resultant horizontal control signal into a transmitting format as illustrated in FIG. 2A to transmit the signal to the microcomputer of the monitor 30 through the inverter G1 and inverter G3 of the parallel communication section 50. In other words, the PC 40 inputs the clock signal to the inverter G1 connected to the pin No. 2 of the printer port 40B, while inputting serial data in response to the horizontal size control signal, which is synchronized with the clock applied to the inverter G1, through the inverter G3 connected to the pin No. 3. Accordingly, the serial data inputted to the inverter G3 of the parallel communication section 50 are inputted to the SDA terminal of the microcomputer through the pin No. 12 of the D-sub connector 20 of the monitor 30 as illustrated in FIG. 4A. At the same time, the serial clock signal inputted to the inverter G1 of the parallel communication section 50 is inputted to the SCL terminal of the microcomputer of the monitor 30 through the pin No. 15 of the D-sub connector 20 of the monitor 30 as illustrated in FIG. 4A. The microcomputer of the monitor 30 then decodes the serial data in response to the inputted horizontal size control signal to input the horizontal size control signal to the horizontal size control circuit section (not illustrated). The horizontal size control circuit section controls a pulse width modulation (PWM) value in response to the horizontal size control signal of the microcomputer to adjust the horizontal size.

On the other hand, when reading the serial data from the microcomputer by means of the parallel communications section 50, the microcomputer transmits the serial clock and the data to the inverter G2 and inverter G4 of the parallel communication section 50 through the SDA line and SCL line of the D-sub connector 20, respectively, and the PC 40 reads the serial clock and the data form the inverter G2 and the inverter G4.

Meanwhile, the PC 40 feeds back the data and the clock signal outputted from the inverter G1 and the inverter G3 through the inverter G2 and the inverter G4 of the parallel communication section 50 to determine whether the present clock line and the data line operate in normal status. If the PC 40 and the monitor 30 are determined to operate in normal status, an image signal and a synchronous signal are inputted through the PC input port 40.

Figure 2B:
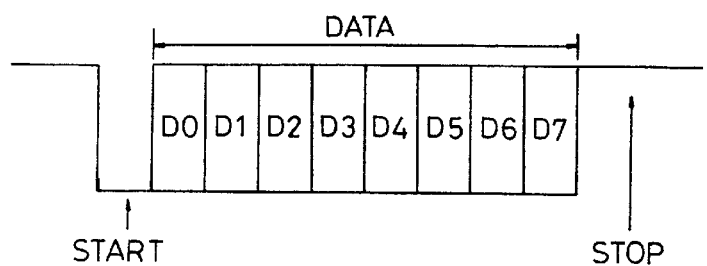
FIG. 2B is a waveform diagram illustrating the waveform generated from the COM port for RS232C communication according to the present invention.

Meanwhile, when performing serial communication by means of the COM port, the user must switch on the serial switch SW1, and set a signal to control the horizontal size. Then, the PC 40 converts the serial data according to the horizontal size into the transmitting format as illustrated in FIG. 2B, and outputs the serial data through the pin No. 3 of the COM port 40A. The serial data outputted from the pin No. 3 of the COM port 40A are inputted to the pin No. 5 of the D-sub connector via the serial switch SW1. The serial data are then inputted to the base terminal of the transistor Q11 connected to the pin No. 5 of the D-sub connector 20. The transistor Q11 is subsequently switched on, and the serial data of RS232C are inputted to the interrupt terminal of the microcomputer.

At this stage, the microcomputer performs detection starting from the edge point at which the initial interval of the inputted serial data decreases from the value 'high' to the value 'low' as shown in FIG. 2B. The microcomputer subsequently generates an interrupt according to the starting condition of the serial data, and decodes the remaining serial data to input the horizontal size control signal to the horizontal size control circuit section (not illustrated).

The horizontal size control circuit section controls the PWM value in response to the horizontal size control signal of the microcomputer to adjust the horizontal size (PWMO-PWMN).

Thus, according to the present invention, serial data can be transmitted by means of the printer port 40B which performs parallel communication. RS232C communication can also be performed by means of the COM port 40A.

As described above, the present invention results in an effect of improving communicability between a PC and a monitor by realizing an interface for communication which utilizes a COM port as well as a printer port to communicate with a microcomputer of the monitor, and inputs/outputs serial data through the printer port and the COM port simultaneously.

While the present invention has been described and illustrated herein with reference to the preferred embodiment thereof, it will be understood by those skilled in the art that various changes in form and details may be made therein without departing from the spirit and scope of the invention.

What is claimed is:

1. A monitor system comprising:
   a monitor having a microcomputer connected via a communication interface with a personal computer (PC), the interface being connected to a printer port of the PC for providing a serial clock and serial data to the printer port of the PC, and the interface being connected to a communication COM port of the PC for serial transmission of data whereby data is written in or read out from the microcomputer through the interface;
   wherein the interface includes selection means for selecting one of the communication ports.

2. The monitor system as claimed in claim 1, further comprising:
   a display port of the monitor connected to a display port of the PC and operable to receive display information from the PC for display on the monitor and a switch connected to display ports for controlling the writing of data.

3. A system as defined in claim 1, wherein said system includes circuitry for transmitting output signals from the PC to the microcomputer while the printer port is in use.

4. A monitor interface for connecting a monitor having a microcomputer for communications with a personal computer (PC), the interface including:
   a connector connectable to a printer port of the PC for providing a serial clock and serial data to the printer port of the PC, and the interface including a connector connectable to a communication COM port of the PC for serial transmission of data, whereby data is stored in or read out from the microcomputer through the interface; and
   a switch for switching communications between the printer port of the PC and the COM port of the PC.

5. The monitor interface as claimed in claim 4, further comprising:
   selected means for selecting one of the ocmmunication ports.

6. The monitor interface as claimed in claim 4, further comprising:
   a display port of the monitor connectable to a display port of the PC and operable to receive display information from the PC for display on the monitor, and a switch connected to display port for controlling the writing of data.

7. A system as defined in claim 4, wherein said system includes circuitry for transmitting output signals from the PC to the microcomputer while the printer port is in use.

8. A monitor system comprising:
   a monitor having a microcomputer connected via a communication interface with a personal computer (PC), the interface being connected to a printer port of the PC for providing a serial clock and serial data to the printer port of the PC, and the interface being connected to a communication COM port of the PC for serial transmission of data whereby data is written in or read out from the microcomputer through the interface;
   wherein the interface includes selection means for selecting one of the communication ports through a keyboard provided with the PC;
   a D-sub connector and a switch, connected between the COM port and the D-sub connector, for switch-controlling the data communication lines to effect a serial communication through the COM port, and
   a transistor, connected to a serial data signal from the D-sub connector, for providing an interrupt switching signal to the microcomputer when serial communication is effected.

9. A monitor interface for connecting a monitor having a microcomputer for communications with a personal computer (PC), the interface including:
   a connector connectable to a printer port of the PC for providing a serial clock and serial data to the printer port of the PC, and the interface including a connector connectable to a communication COM port of the PC for serial transmission of data, whereby data is stored in or read out from the microcomputer through the interface;
   a switch for switching communications between the printer port of the PC and the COM port of the PC;
   a D-sub connector and a switch, connected between said communication port and the D-sub connector, for switch-controlling the communication lines to effect a serial communication through the COM port; and
   a transistor, connected to one side of the D-sub connector, for providing an interrupt switching signal to the microcomputer when serial communication is effected.

* * * * *